US011939907B2

(12) United States Patent
Katayama

(10) Patent No.: US 11,939,907 B2
(45) Date of Patent: Mar. 26, 2024

(54) ENGINE CONTROL DEVICE

(71) Applicant: TOYOTA JIDOSHA KABUSHIKI KAISHA, Toyota (JP)

(72) Inventor: Akihiro Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/045,494

(22) Filed: Oct. 11, 2022

(65) Prior Publication Data
US 2023/0193814 A1      Jun. 22, 2023

(30) Foreign Application Priority Data

Dec. 20, 2021   (JP) .................................. 2021-206379

(51) Int. Cl.
| | | |
|---|---|---|
| *F02B 37/18* | (2006.01) | |
| *B60W 10/06* | (2006.01) | |
| *B60W 10/08* | (2006.01) | |
| *B60W 20/15* | (2016.01) | |
| *F01N 3/20* | (2006.01) | |
| *F01N 13/00* | (2010.01) | |
| *F02D 41/00* | (2006.01) | |
| *F02D 41/14* | (2006.01) | |
| *F02D 41/22* | (2006.01) | |

(52) U.S. Cl.
CPC .......... *F02B 37/183* (2013.01); *B60W 10/06* (2013.01); *B60W 10/08* (2013.01); *B60W 20/15* (2016.01); *F01N 3/20* (2013.01); *F01N 13/008* (2013.01); *F02D 41/0007* (2013.01); *F02D 41/1454* (2013.01); *F02D 41/221* (2013.01)

(58) Field of Classification Search
CPC ...... F02B 37/183; F02D 41/0007; F01N 3/20; F01N 13/008; B60W 10/06; B60W 10/08; B60W 20/15
See application file for complete search history.

(56) References Cited

U.S. PATENT DOCUMENTS

| | | | |
|---|---|---|---|
| 2012/0209496 A1 | 8/2012 | Miyashita | |
| 2016/0131065 A1* | 5/2016 | Ossareh | F01D 17/105 |
| | | | 73/112.05 |
| 2017/0159586 A1* | 6/2017 | Takahashi | F02B 37/18 |
| 2018/0258817 A1 | 9/2018 | Kosuge et al. | |
| 2020/0240334 A1* | 7/2020 | Bastanipour | F02D 23/00 |
| 2022/0074812 A1* | 3/2022 | Lim | G01M 15/04 |
| 2023/0193815 A1* | 6/2023 | Katayama | F02B 37/183 |
| | | | 60/602 |

FOREIGN PATENT DOCUMENTS

| | | |
|---|---|---|
| JP | 5196036 B2 | 5/2013 |
| JP | 2018-145914 A | 9/2018 |

* cited by examiner

*Primary Examiner* — John Kwon
(74) *Attorney, Agent, or Firm* — Oblon, McClelland, Maier & Neustadt, L.L.P.

(57) ABSTRACT

An ECM executes a catalyst early activation control at the cold start of an engine such that the activation of a catalyzer is promoted by opening a WGV. Further, the ECM performs a diagnosis process of diagnosing whether or not the WGV is stuck closed, based on the amplitude of the output fluctuation in an air-fuel-ratio sensor during execution of the catalyst early activation control.

6 Claims, 5 Drawing Sheets

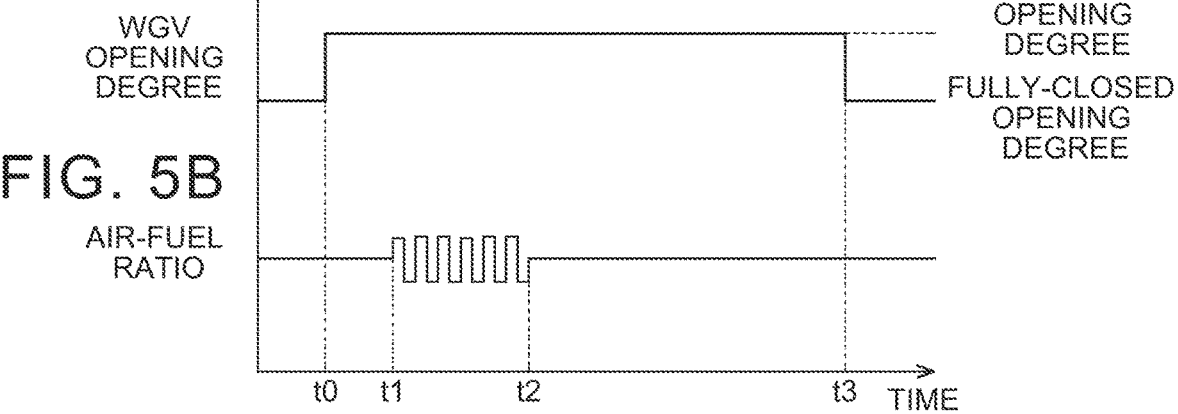
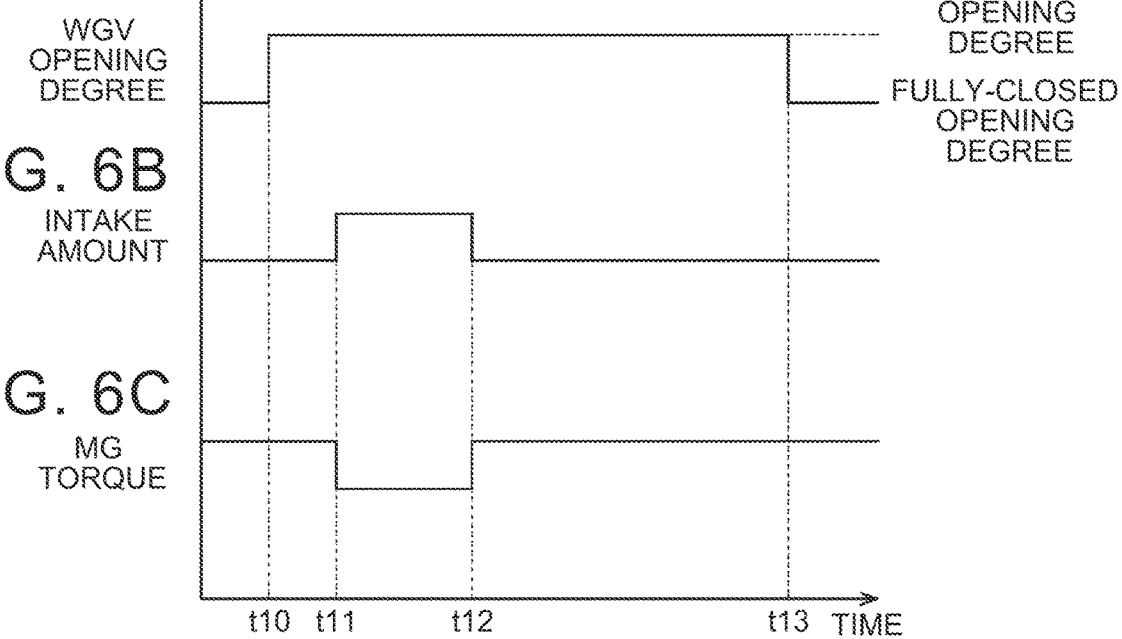

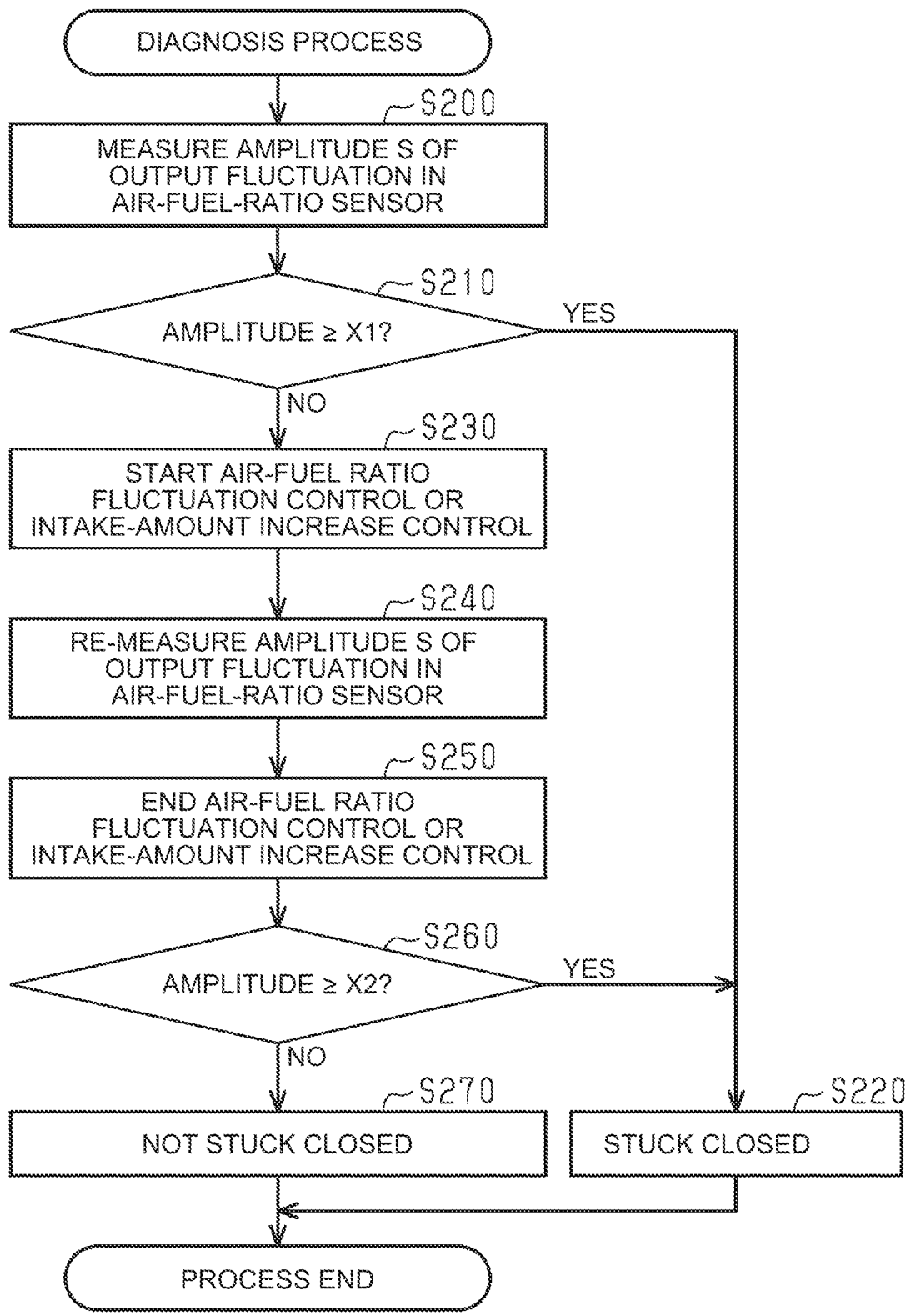

ENGINE CONTROL DEVICE

CROSS-REFERENCE TO RELATED APPLICATION

This application claims priority to Japanese Patent Application No. 2021-206379 filed on Dec. 20, 2021, incorporated herein by reference in its entirety.

BACKGROUND

1. Technical Field

The present disclosure relates to an engine control device for controlling an engine including a turbocharger.

2. Description of Related Art

Some turbochargers include a bypass passage through which exhaust gas flows to detour around a turbine and a wastegate valve configured to open and close the bypass passage. Japanese Unexamined Patent Application Publication No. 2018-145914 (JP 2018-145914 A) describes an engine control device for controlling an engine including a turbocharger provided with a bypass passage and a wastegate valve. The engine control device described in JP 2018-145914 A opens the wastegate valve at cold start of the engine to execute a catalyst early activation control by which a catalyzer is activated at an earlier timing. When the wastegate valve is opened, exhaust gas intensively hits part of the catalyzer. On this account, a part where a catalyst is activated is formed earlier than a case where the exhaust gas is equally blown against the whole catalyzer. Accordingly, by executing the catalyst early activation control, it is possible for the catalyzer to start to clean the exhaust gas earlier.

SUMMARY

However, during a stop of the engine, the wastegate valve might be stuck closed. In a case where the wastegate valve is stuck closed as such, even when the wastegate valve is instructed to be opened, the wastegate valve does not open. Accordingly, the catalyst early activation control cannot be executed appropriately. On this account, at the time of execution of the catalyst early activation control, it is desirable to check in advance that the wastegate valve is not stuck closed. In view of this, before the start of the catalyst early activation control, it is conceivable to diagnose whether or not the wastegate valve is stuck closed. However, in such a case, just by the time required for the diagnosis, the start of the catalyst early activation control is delayed, and eventually, the timing when the catalyzer starts to clean exhaust gas is delayed.

An engine control device accomplished to achieve the above object is an engine control device for controlling an engine. The engine includes a combustion chamber, an exhaust passage, a turbocharger, a bypass passage, a wastegate vale, an air-fuel-ratio sensor, and a catalyzer. In the combustion chamber, combustion of fuel-air mixture is performed. Through the exhaust passage, exhaust gas discharged from the combustion chamber flows. The turbocharger includes a turbine provided in the exhaust passage. The bypass passage branches off from the exhaust passage at a part of the exhaust passage on an upstream side from the turbine and merging the exhaust passage at a part of the exhaust passage on a downstream side from the turbine. The wastegate valve is configured to open and close the bypass passage. The air-fuel-ratio sensor is provided in a part of the exhaust passage on the downstream side from the turbine. The catalyzer is configured to clean the exhaust gas. The catalyzer is provided in a part of the exhaust passage, the part being on the downstream side from the air-fuel-ratio sensor and on the downstream side from a merging position where the bypass passage merges with the exhaust passage. The engine device executes the followings: a catalyst early activation control at cold start of the engine such that the catalyzer is promoted to be activated by opening the wastegate valve; and a diagnosis process of diagnosing whether or not the wastegate valve is stuck closed, based on an amplitude of output fluctuation in the air-fuel-ratio sensor during execution of the catalyst early activation control.

An exhaust gas amount to be blown against the air-fuel-ratio sensor changes between an opened state of the wastegate valve and a closed state of the wastegate valve. Note that, depending on arrangement of the bypass passage, the air-fuel-ratio sensor, or the like, the blowing amount of the exhaust gas to be blown against the air-fuel-ratio sensor may become larger in the opened state of the wastegate valve than in the closed state of the wastegate valve or may become smaller in the opened state of the wastegate valve than in the closed state of the wastegate valve. In a case where the blowing amount of the exhaust gas is large, a change in the actual air-fuel ratio of fuel-air mixture burnt in the combustion chamber is easily reflected on the output from the air-fuel-ratio sensor in comparison with a case where the blowing amount of the exhaust gas is small.

At cold start of the engine, combustion is hard to be stable, and therefore, the air-fuel ratio easily fluctuates. In the meantime, a difference occurs in the blowing amount of the exhaust gas against the air-fuel-ratio sensor between a case where the wastegate valve is normally opened during execution of the catalyst early activation control and a case where the wastegate valve is not opened during the execution of the catalyst early activation control because the wastegate valve is stuck closed. Depending on the difference in the blowing amount, the fluctuation in the air-fuel ratio is easily reflected on the output from the air-fuel-ratio sensor or is hard to be reflected thereon. Accordingly, it is possible to determine, based on the amplitude of the output fluctuation in the air-fuel-ratio sensor during execution of the catalyst early activation control, whether or not the wastegate valve is normally opened, that is, whether or not the wastegate valve is stuck closed. The diagnosis on valve stuck closing can be performed while the execution of the catalyst early activation control is continued. Accordingly, with the engine control device, it is possible to restrain delay in starting to clean exhaust gas in the catalyzer and to perform diagnosis on whether or not the wastegate valve is stuck closed.

In the engine control device, an air-fuel ratio fluctuation control may be executed during execution of the diagnosis process such that an air-fuel ratio of the fuel-air mixture to be burned in the combustion chamber is fluctuated. In such a case, the air-fuel ratio fluctuates largely during the diagnosis on stuck closing, so that a large difference occurs in the amplitude of the output fluctuation in the air-fuel-ratio sensor between the normal time and the time when the wastegate valve is stuck closed. This accordingly makes it possible to improve the accuracy in diagnosis on whether or not the wastegate valve is stuck closed.

Further, in a case where the air-fuel ratio fluctuation control is executed, the engine control device may be configured such that the diagnosis process includes a first diagnosis process of diagnosing whether or not the wastegate valve is stuck closed in a state where the air-fuel ratio fluctuation control is not executed, and a second diagnosis process of diagnosing whether or not the wastegate valve is stuck closed in a state where the air-fuel ratio fluctuation control is executed. The second diagnosis process may be performed after the first diagnosis process. In a case where the diagnosis process is performed in a state where the air-fuel ratio fluctuation control is executed, the accuracy in diagnosis improves. However, in a state where combustion easily becomes unstable just after the start of the engine, this might cause poor combustion. In the meantime, in a case where the diagnosis is performed only after the fluctuation in the air-fuel ratio does not cause poor combustion, it is difficult to find valve stuck closing early. Accordingly, first, the diagnosis is performed without executing the air-fuel ratio fluctuation control, and after that, the air-fuel ratio fluctuation control is executed, and then, the diagnosis is performed.

Further, in the engine control device, an intake-amount increase control may be executed during execution of the diagnosis process such that an intake amount of the engine is increased. When the intake amount is increased, the flow rate of the exhaust gas increases. Accordingly, a large difference occurs in the blowing amount of the exhaust gas to be blown against the air-fuel-ratio sensor between a case where the wastegate valve is normally opened and a case where the wastegate valve is stuck closed. This accordingly makes it possible to improve the accuracy in diagnosis on whether or not the wastegate valve is stuck closed.

Further, in a case where the intake-amount increase control is executed, the engine control device may be configured such that the diagnosis process includes a third diagnosis process of diagnosing whether or not the wastegate valve is stuck closed in a state where the intake-amount increase control is not executed, and a fourth diagnosis process of diagnosing whether or not the wastegate valve is stuck closed in a state where the intake-amount increase control is executed. The fourth diagnosis process may be performed after the third diagnosis process. In a case where the diagnosis process is performed in a state where the intake-amount increase control is executed, the accuracy in diagnosis improves. However, in a state where catalyst is not activated right after the start of the engine, the exhaust performance of the engine might decrease. In the meantime, in a case where the diagnosis is performed after the increase in the intake amount does not decrease the exhaust performance, it is difficult to find valve stuck closing early. Accordingly, first, the diagnosis is performed without executing the intake-amount increase control, and after that, the intake-amount increase control is executed, and then, the diagnosis is performed.

Further, the engine control device may be configured such that: the engine control device is provided in a hybrid electric vehicle including a generator motor drivingly connected to the engine; the engine control device controls a driving force to drive the hybrid electric vehicle through torque adjustment of both of the engine and the generator motor; and the engine control device executes a torque absorption control during execution of the intake-amount increase control such that an increased amount in torque of the engine due to the intake-amount increase control is at least partially absorbed by the torque adjustment of the generator motor. When the intake amount of the engine is increased, the engine torque increases. Accordingly, it is desirable that the torque absorption control be executed together with the intake-amount increase control such that an increased amount in the engine torque due to an increase in the intake air is not just reflected on the driving force to drive the hybrid electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a time chart illustrating the transition of the opening degree of the wastegate valve when an engine control device according to a second embodiment executes the catalyst early activation control;

FIG. 5B is a time chart illustrating the transition of the air-fuel ratio when the engine control device according to the second embodiment executes the catalyst early activation control;

FIG. 6A is a time chart illustrating the transition of the opening degree of the wastegate valve when an engine control device according to a third embodiment performs a diagnosis process;

FIG. 6B is a time chart illustrating the transition of the intake amount when the engine control device according to the third embodiment performs the diagnosis process;

FIG. 6C is a time chart illustrating the transition of MG torque when the engine control device according to the third embodiment performs the diagnosis process; and FIG. 7 is a flowchart illustrating the procedure of a catalyst early activation control to be executed by an engine control device according to a fourth embodiment.

DETAILED DESCRIPTION OF EMBODIMENTS

First Embodiment

A first embodiment of an engine control device will be described below in detail with reference to FIGS. 1 to 4.

Configuration of Engine Control Device

Figure 1:
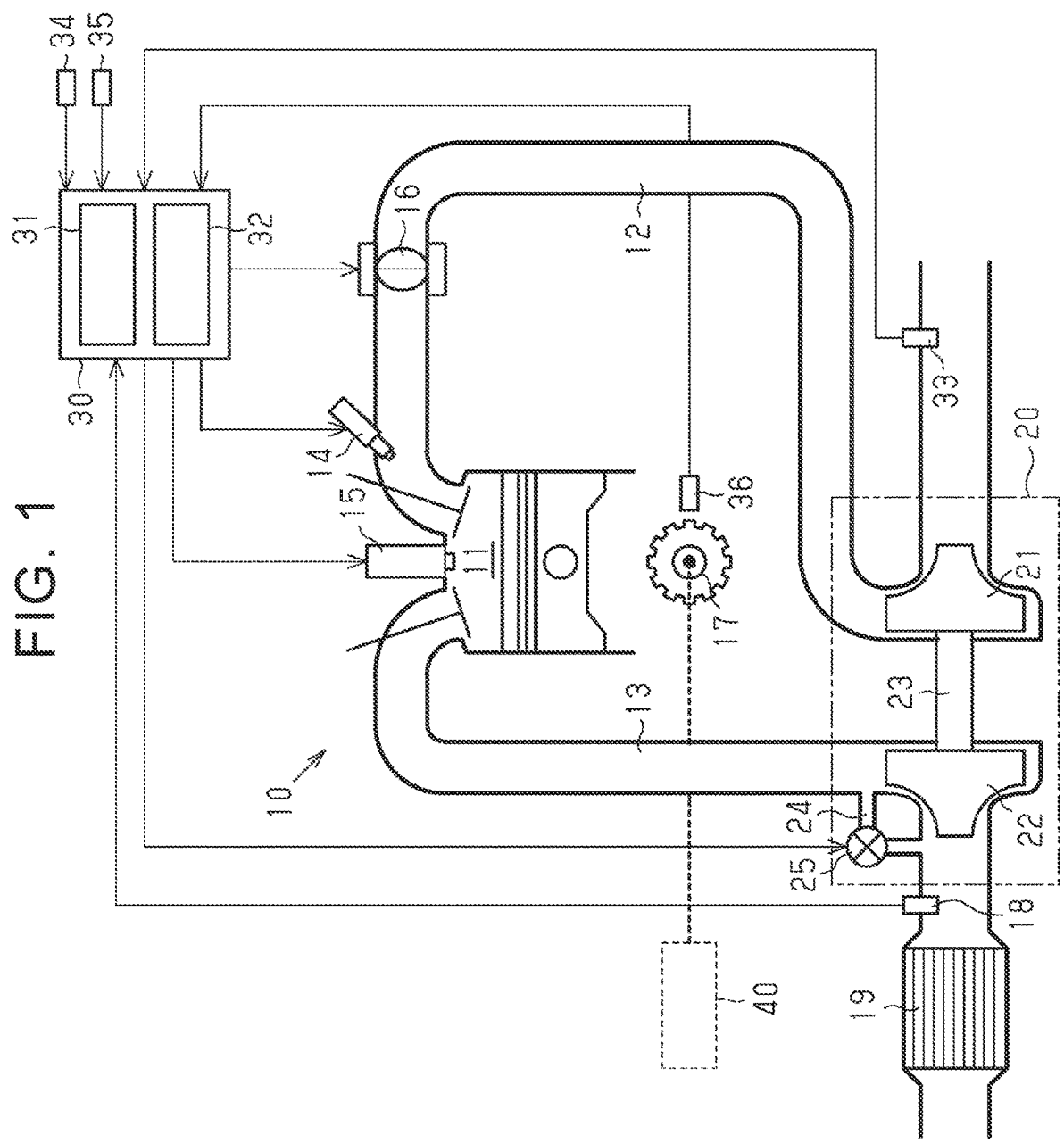
FIG. 1 is a view schematically illustrating a configuration of an engine control device according to a first embodiment.

With reference to FIG. 1, the configuration of the engine control device according to the present embodiment will be described first. An engine 10 to which the engine control device of the present embodiment is applied includes a combustion chamber 11 configured to burn fuel-air mixture. Further, the engine 10 includes an intake passage 12 as an introduction passage for intake air to the combustion chamber 11, and an exhaust passage 13 as a discharge passage for exhaust air from the combustion chamber 11. The engine 10 includes an injector 14 configured to inject fuel during intake of air to be introduced into the combustion chamber 11, and an ignition device 15 configured to ignite the fuel-air mixture in the combustion chamber 11 by spark discharge. A throttle valve 16 is provided in a part of the intake passage 12 on the downstream side from a compressor 21. The throttle valve 16 adjusts the amount of the intake air to be introduced into the combustion chamber 11 in response to changes in the opening degree. The engine 10 generates a driving force to drive a vehicle by rotating a crankshaft 17 by combustion of the fuel-air mixture in the combustion chamber 11.

The engine 10 includes a turbocharger 20. The turbocharger 20 includes the compressor 21 provided in the intake passage 12, and a turbine 22 provided in the exhaust passage 13. The compressor 21 is an impeller configured to compress the intake air by rotation. The turbine 22 is an impeller configured to rotate by receiving the flow of exhaust gas. The compressor 21 is connected to the turbine 22 via a turbine shaft 23. Hereby, the compressor 21 rotates in conjunction with the rotation of the turbine 22. Further, the exhaust passage 13 is provided with a bypass passage 24 as a passage through which the exhaust gas flows by detouring around the turbine 22. The bypass passage 24 branches off from the exhaust passage 13 at a part of the exhaust passage 13 on the upstream side from the turbine 22. The bypass passage 24 merges with the exhaust passage 13 at a part of the exhaust passage 13 on the downstream side from the turbine 22. A wastegate valve (WGV) 25 configured to open and close the bypass passage 24 is provided at a merging position where the bypass passage 24 merges with the exhaust passage 13.

The exhaust passage 13 is provided with an air-fuel-ratio sensor 18 as a sensor configured to detect the air-fuel ratio of the fuel-air mixture burnt in the combustion chamber 11. The air-fuel-ratio sensor 18 is provided in a part of the exhaust passage 13 that is on the downstream side from the turbine 22 and on the downstream side from the merging position where the bypass passage 24 merges with the exhaust passage 13. Further, the exhaust passage 13 is provided with a catalyzer 19 on which catalyst for cleaning exhaust gas such as a three-way catalyst is carried. The catalyzer 19 is provided in a part of the exhaust passage 13 that is on the downstream side from the air-fuel-ratio sensor 18.

The engine 10 is controlled by an engine control module (ECM) 30 as an engine control device. The ECM 30 includes a processing device 31 and a storage device 32. In the storage device 32, a program and data for engine control are stored. The processing device 31 controls the engine 10 by reading the program from the storage device 32 and executing the program. Detection results from various sensors configured to detect the driving condition of the engine 10 are input into the ECM 30. The sensors the detection results of which are input into the ECM 30 includes an air flow meter 33, an intake-air temperature sensor 34, a coolant temperature sensor 35, and a crank angle sensor 36 in addition to the air-fuel-ratio sensor 18. The air flow meter 33 is a sensor configured to detect an intake-air flow rate GA as the flow rate of the intake air flowing through the intake passage 12. The intake-air temperature sensor 34 is a sensor configured to detect an intake-air temperature THA that is the temperature of the intake air taken into the intake passage 12. The coolant temperature sensor 35 is a sensor configured to detect an engine water temperature THW as the temperature of the coolant in the engine 10. The crank angle sensor 36 is a sensor configured to detect a crank angle CRNK as the rotation angle of the crankshaft 17. Based on the detection results from these sensors, the ECM 30 controls the fuel injection amount and the fuel injection timing of the injector 14, the ignition timing of the ignition device 15, the opening degrees of the throttle valve 16 and the WGV 25, and so on. Note that, the ECM 30 controls the fuel injection amount during the operation of the engine 10 basically such that the air-fuel ratio of the fuel-air mixture to be burnt in the combustion chamber 11 reaches a theoretical air-fuel ratio.

Catalyst Early Activation Control

At cold start of the engine 10, the ECM 30 opens the WGV 25 to execute a catalyst early activation control such that the activation of the catalyzer 19 is promoted. Further, the ECM 30 performs a diagnosis process of diagnosing whether or not the WGV 25 is stuck closed, during the execution of the catalyst early activation control. Note that, in the following description, the opening degree of the WGV 25 at the time when the WGV 25 shuts off the circulation of the exhaust gas through the bypass passage 24 is referred to as a fully-closed opening degree. Further, the opening degree of the WGV 25 that is a maximum value within a control range of the opening degree of the WGV 25 is referred to as a fully-opened opening degree. The opening degree of the WGV 25 that is larger than the fully-closed opening degree and smaller than the fully-opened opening degree is referred to as an intermediate opening degree.

Figure 2:
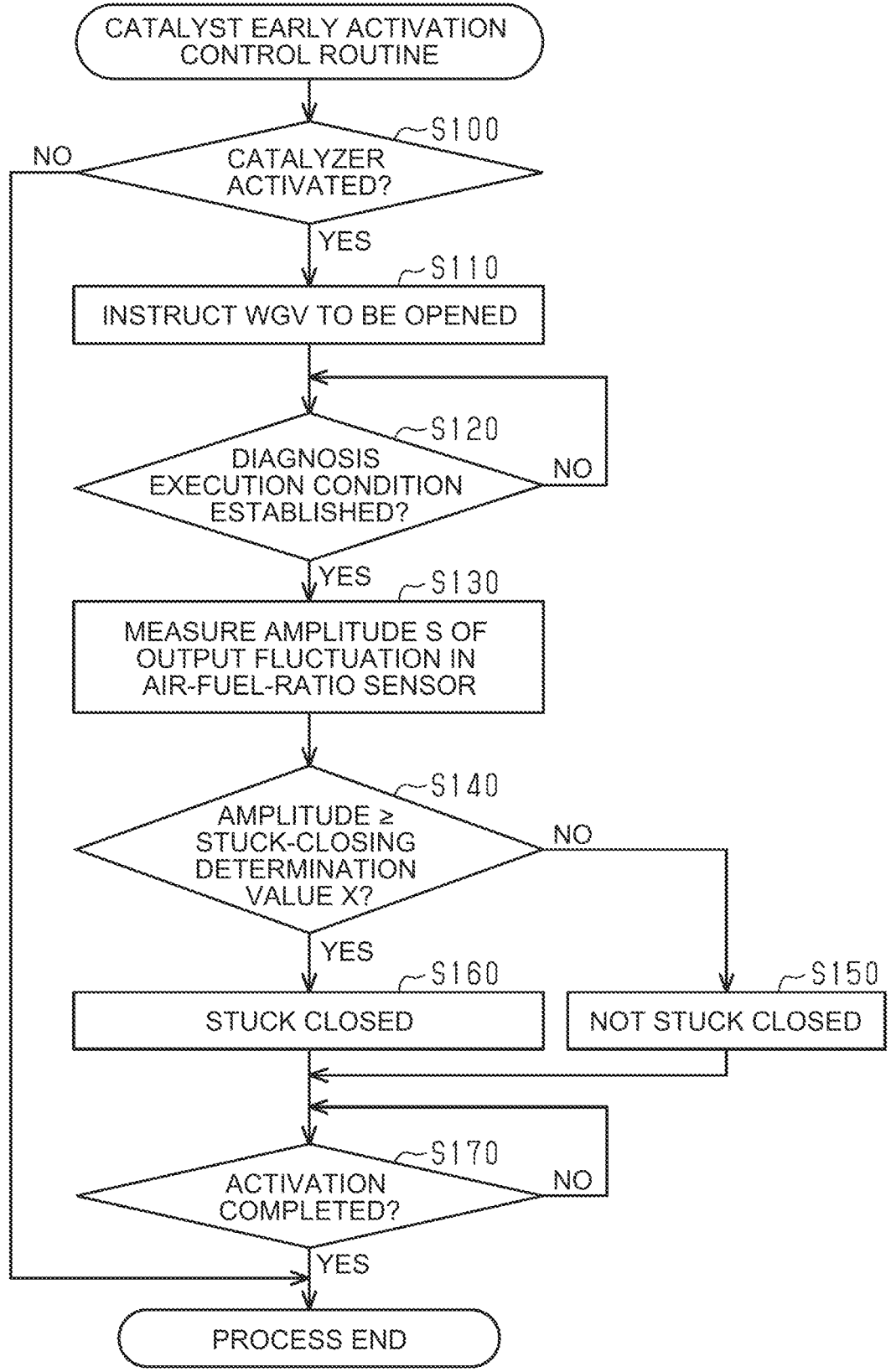
FIG. 2 is a flowchart illustrating the procedure of a catalyst early activation control to be executed by the engine control device.

FIG. 2 illustrates the procedure of a catalyst early activation control routine to be executed by the ECM 30 executes after the engine 10 has been started. When the routine is started, the ECM 30 first determines in step S100 whether or not the catalyzer 19 is in a non-active state. In the present embodiment, this determination is performed based on the intake-air temperature THA and the engine water temperature THW at the time of engine start. In a case where the ECM 30 determines that the catalyzer 19 is in a non-active state (YES), the ECM 30 advances the process to step S110. In the meantime, in a case where the catalyzer 19 has been already activated at this point like hot start of the engine 10 (NO), the ECM 30 just ends the process of this routine.

When the process proceeds to step S110, the ECM 30 gives a valve-opening command to the WGV 25 in step S110. This valve-opening command is a command to instruct the WGV 25 to keep its given opening degree, e.g., the fully-opened opening degree. After that, the ECM 30 waits for establishment of a diagnosis execution condition (S120: YES) and advances the process to step S130. The diagnosis execution condition is that the engine revolution speed or the engine load factor is stable, for example.

When the diagnosis execution condition is established and the process proceeds to step S130, the ECM 30 measures an amplitude S of an output fluctuation in the air-fuel-ratio sensor 18 in step S130. Then, in step S140, the ECM 30 determines whether or not the amplitude S is equal to or more than a given stuck-closing determination value X. In a case where the amplitude S is equal to or more than the stuck-closing determination value X (S140: YES), the ECM 30 diagnoses in step S150 that the WGV 25 is stuck closed. In the meantime, in a case where the amplitude S is less than the stuck-closing determination value X (S140: NO), the ECM 30 diagnoses in step S160 that the WGV 25 is not stuck closed. Note that, when the ECM 30 diagnoses that the WGV 25 is stuck closed (S140), the ECM 30 executes an abnormality handling process corresponding to the valve stuck closing. Examples of the abnormality handling process include a process of notifying a user of the occurrence of an abnormality by lighting of an indicator, or the like, and a process of restricting the output from the engine 10. Note that, in the present embodiment, the processes of steps S130 to S160 in FIG. 2 correspond to the diagnosis process.

After that, when the activation of the catalyzer 19 is completed (S170: YES), the ECM 30 ends the process of the catalyst early activation control at the cold start at this time. Subsequently, the ECM 30 executes an opening degree control on the WGV 25 based on the driving condition of the engine 10.

In the present embodiment, the determination on whether or not the activation of the catalyzer 19 is completed is made based on a start-up coolant temperature, the intake-air temperature THA, and an accumulated intake amount. The start-up coolant temperature is a value of the engine water temperature THW at the start of the engine 10. The accumulated intake amount is an accumulation value of the intake-air flow rate GA after the start of the engine 10. As described above, the ECM 30 controls the fuel injection amount such that the air-fuel ratio of the fuel-air mixture to be burnt in the combustion chamber 11 reaches the theoretical air-fuel ratio. Accordingly, the amount of heat of exhaust gas to be discharged from the combustion chamber 11 is larger as the intake-air flow rate GA is larger. On this account, the amount of heat that the catalyzer 19 receives from the exhaust gas after the start of the engine 10 is found based on the accumulated intake amount. Meanwhile, the catalyst temperature of the catalyzer 19 at the start of the engine 10 is found based on the start-up coolant temperature. Further, the heat dissipation amount from the catalyzer 19 to the external air is larger as the temperature difference between the catalyzer 19 and the external air is larger. The temperature of the external air is found based on the intake-air temperature THA. Accordingly, whether or not the catalyst reaches a temperature necessary for activation can be determined based on the start-up coolant temperature, the intake-air temperature THA, and the accumulated intake amount.

Operations and Effects of Embodiment

Next will be described operations and effects of the present embodiment. Note that, in the following description, an end surface of the catalyzer 19 on the upstream side in the exhaust-gas flowing direction is described as a front end of the catalyzer 19.

Figure 3:
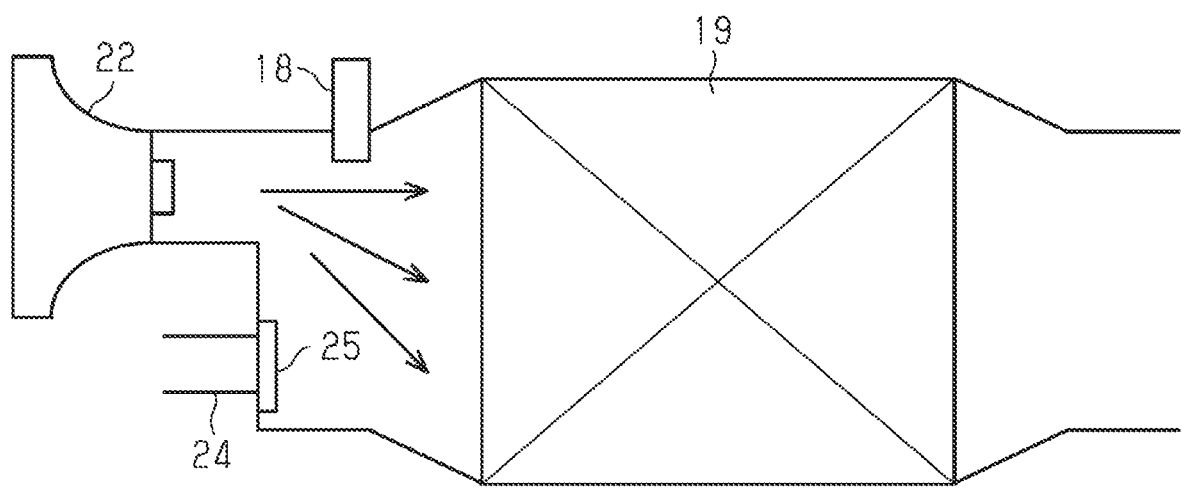
FIG. 3 is a view illustrating the flow of exhaust gas on the downstream side from a turbine when a wastegate valve is closed in an engine to which the engine control device is applied.

FIG. 3 illustrates the flow of the exhaust gas on the downstream side from the turbine 22 at the time when the WGV 25 is closed. When the WGV 25 is closed, the exhaust gas flows through the turbine 22. The flow of the exhaust gas passing through the turbine 22 becomes a swirl flow such that the exhaust gas is diffused in a wide range. On that account, at this time, the exhaust gas is blown against the wide range of the front end of the catalyzer 19.

Figure 4:
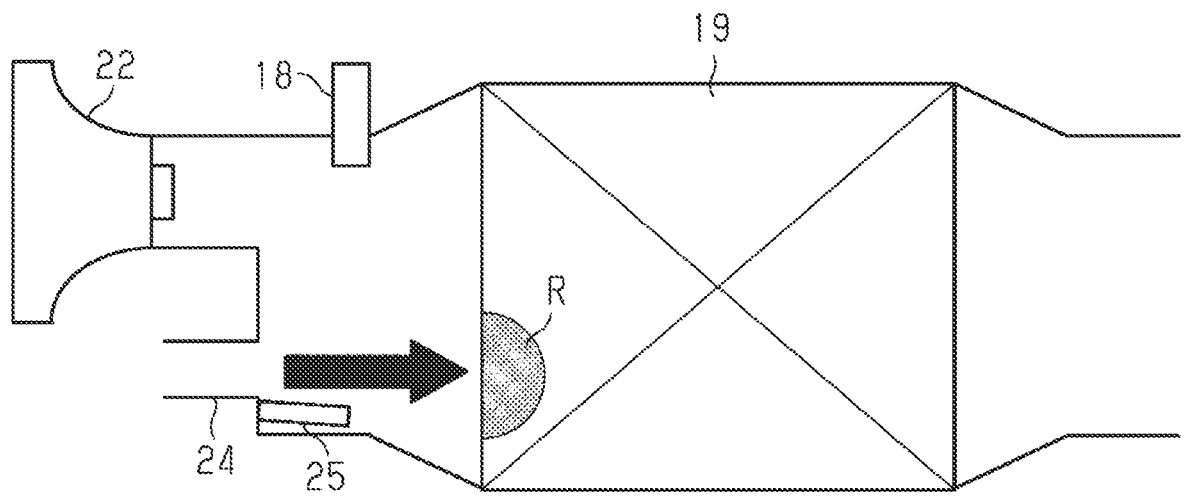
FIG. 4 is a view illustrating the flow of exhaust gas on the downstream side from the turbine when the wastegate valve is opened in the engine to which the engine control device is applied.

FIG. 4 illustrates the flow of the exhaust gas on the downstream side from the turbine 22 at the time when the WGV 25 is opened. At this time, most of the exhaust gas flows through the bypass passage 24. The flow of the exhaust gas passing through the bypass passage 24 becomes a jet flow. On that account, at this time, the exhaust gas is intensively blown against part of the front end of the catalyzer 19. Accordingly, in a case where the WGV 25 is opened, a part R where the catalyst is activated is formed in the catalyzer 19 earlier than a case where the WGV 25 is closed. Hereby, the catalyst early activation control shortens a period during which the catalyzer 19 cannot clean the exhaust gas after the cold start of the engine 10.

However, at the cold start of the engine 10, combustion is hard to be stable, and therefore, the air-fuel ratio easily fluctuates. In the meantime, as illustrated in FIGS. 3, 4, the air-fuel-ratio sensor 18 in the engine 10 in FIG. 1 is provided in a part where the exhaust gas passing through the bypass passage 24 is hard to hit the air-fuel-ratio sensor 18, but the exhaust gas passing through the turbine 22 easily hits the air-fuel-ratio sensor 18. Therefore, the blowing amount of the exhaust gas to be blown against the air-fuel-ratio sensor 18 during the catalyst early activation control is small in a case where the WGV 25 is opened normally but is large in a case where the WGV 25 is stuck closed. In a case where the blowing amount of the exhaust gas is small, the actual fluctuation in the air-fuel ratio is hard to be reflected on the output from the air-fuel-ratio sensor 18. Accordingly, in a case where the WGV 25 is stuck closed, the amplitude S of the output fluctuation in the air-fuel-ratio sensor 18 during the catalyst early activation control is large, in comparison with a case where the WGV 25 is not stuck closed. In view of this, in the present embodiment, whether or not the WGV 25 is stuck closed is diagnosed based on the magnitude of the amplitude S of the output fluctuation in the air-fuel-ratio sensor 18 during the catalyst early activation control.

With the engine control device of the present embodiment, the following effects can be yielded.

(1) Whether or not the WGV 25 is stuck closed can be diagnosed accurately based on the amplitude S of the output fluctuation in the air-fuel-ratio sensor 18 during the catalyst early activation control.

(2) The diagnosis can be performed while the WGV 25 is kept opened. As a result, the activation of the catalyzer 19 by the catalyst early activation control does not delay.

(3) The diagnosis is performed during the catalyst early activation control to be executed just after the start of the engine 10. Accordingly, it is possible to check the occurrence of the valve stuck closing in the WGV 25 in a short time from the start of the engine 10.

Second Embodiment

Next will be described a second embodiment of the engine control device in detail with reference to FIGS. 5A, 5B. Note that, in the present embodiment, constituents similar to the constituents in the above embodiment have the same reference signs as in the above embodiment, and detail descriptions thereof are omitted.

The engine control device of the present embodiment also executes the catalyst early activation control, similarly to the first embodiment. In the present embodiment, whether or not the WGV 25 is stuck closed is diagnosed based on the amplitude S of the output fluctuation in the air-fuel-ratio sensor 18 during execution of the catalyst early activation control. Note that the engine control device of the present embodiment is configured to execute an air-fuel ratio fluctuation control during execution of the diagnosis process such that the air-fuel ratio of the fuel-air mixture to be burned in the combustion chamber 11 is fluctuated.

FIG. 5A illustrates the transition of the opening degree of the WGV 25 during the execution of the catalyst early activation control by the engine control device of the present embodiment. Further, FIG. 5B illustrates the transition of the air-fuel ratio during the execution of the catalyst early activation control.

In the case of FIGS. 5A, 5B, the ECM 30 starts the catalyst early activation control at time t0 by instructing the WGV 25 to be opened. Then, the ECM 30 performs the diagnosis process on whether or not the WGV 25 is stuck closed, based on the output from the air-fuel-ratio sensor 18 during the period from t1 to t2 after that. Further, in the case of FIGS. 5A, 5B, the ECM 30 ends the catalyst early activation control at time t3 after that. Then, as illustrated in FIG. 5B, during the period from time t1 to time t2 during which the diagnosis process is performed, the ECM 30 executes the air-fuel ratio fluctuation control such that the air-fuel ratio of the fuel-air mixture to be burnt in the combustion chamber 11 is forcibly fluctuated. More specifically, the ECM 30 executes the air-fuel ratio fluctuation control by controlling the fuel injection amount of the injector 14 such that rich combustion and lean combustion are performed alternately. The rich combustion here indicates combustion to be performed in a state where the fuel injection amount of the injector 14 is increased to be more than an amount necessary to form the theoretical air-fuel ratio. Further, the lean combustion indicates combustion to be performed in a state where the fuel injection amount of the injector 14 is decreased to be less than the amount necessary to form the theoretical air-fuel ratio.

When the air-fuel ratio fluctuation control is executed during the diagnosis process, the air-fuel ratio of the fuel-air mixture to be burnt in the combustion chamber 11 fluctuates largely. As a result, the difference between the amplitude S in a case where the WGV 25 is stuck closed and the amplitude S in a case where the WGV 25 is not stuck closed becomes large. Accordingly, by executing the air-fuel ratio fluctuation control during the diagnosis process, it is possible to achieve such an effect that the accuracy in diagnosis on whether or not the WGV 25 is stuck closed improves.

Third Embodiment

Next will be described a third embodiment of the engine control device in detail with reference to FIGS. 6A to 6C. The configuration of the engine control device according to the present embodiment is different from the engine control device according to the second embodiment in that an intake-amount increase control is executed during execution of the diagnosis process, instead of the air-fuel ratio fluctuation control.

Note that the engine control device of the present embodiment is provided in a hybrid electric vehicle including a generator motor 40 drivingly connected to the engine 10 as indicated by a broken line in FIG. 1. The ECM 30 in the present embodiment is configured to control a driving force to drive the hybrid electric vehicle through torque adjustment of both of the engine 10 and the generator motor 40.

FIG. 6A illustrates the transition of the opening degree of the WGV 25 during execution of the catalyst early activation control by the engine control device of the present embodiment. Further, FIG. 6B illustrates the transition of the intake-air flow rate GA during the execution of the catalyst early activation control. Further, FIG. 6C illustrates the transition of MG torque during the execution of the catalyst early activation control. Note that the MG torque indicates the torque of the generator motor 40.

In the case of FIGS. 6A to 6C, the ECM 30 starts the catalyst early activation control at time t10 by instructing the WGV 25 to be opened. Then, the ECM 30 performs the diagnosis process of diagnosing on whether or not the WGV 25 is stuck closed, based on the output from the air-fuel-ratio sensor 18 during the period from t11 to t12 after t10. In the case of FIGS. 6A to 6C, the ECM 30 ends the catalyst early activation control at time t13 after time t12 by instructing the WGV 25 to be closed. As illustrated in FIG. 6B, during the period from time t11 to time t12 during which the diagnosis process is performed, the ECM 30 executes the intake-amount increase control such that the intake amount of the engine 10 is increased.

When the intake-amount increase control is executed, the flow rate of exhaust gas to be discharged from the combustion chamber 11 also increases. This accordingly increases the difference between the blowing amount of the exhaust gas against the air-fuel-ratio sensor 18 at the time when the WGV 25 is opened and the blowing amount of the exhaust gas against the air-fuel-ratio sensor 18 at the time when the WGV 25 is closed. As a result, the difference between the amplitude S in a case where the WGV 25 is stuck closed and the amplitude S in a case where the WGV 25 is not stuck closed becomes large. Accordingly, by executing the intake-amount increase control during the diagnosis process, it is also possible to achieve an effect of improving the accuracy in diagnosis on whether or not the WGV 25 is stuck closed.

Note that the brake torque of the engine 10 increases when the intake-air flow rate GA is increased. In view of this, the ECM 30 executes a torque absorption control by decreasing the MG torque during the execution of the intake-amount increase control as illustrated in FIG. 6C, such that an increased amount in the brake torque of the engine 10 is absorbed. Hereby, the ECM 30 prevents an increase in the driving force or the occurrence of blow-up of the engine revolution speed along with the execution of the intake-amount increase control.

Fourth Embodiment

Next will be described a fourth embodiment of the engine control device in detail with reference to FIG. 7.

FIG. 7 illustrates the procedure of a diagnosis process to be executed by the engine control device of the present embodiment. The series of processes illustrated in FIG. 7 are processes to be executed instead of the processes of steps S130 to S160 in FIG. 2. Accordingly, the ECM 30 starts the diagnosis process in FIG. 7 in response to establishment of a diagnosis execution condition after the start of the catalyst early activation control. Then, when the ECM 30 ends the process in FIG. 7, the ECM 30 advances the process to step S170 in FIG. 2.

When the diagnosis process starts, the ECM 30 first measures the amplitude S of the output fluctuation in the air-fuel-ratio sensor 18 in step S200. Then, in step S210, the ECM 30 determines whether or not the measured amplitude S is equal to or more than a first stuck-closing determination value X1. In a case where the amplitude S is equal to or more than the first stuck-closing determination value X1 (S210: YES), the ECM 30 diagnoses, in step S220, that the WGV 25 is stuck closed, and the ECM 30 ends the process of FIG. 7.

Further, in a case where the amplitude S measured in step S200 is less than the first stuck-closing determination value X1 (S210: NO), the ECM 30 starts at least either of the air-fuel ratio fluctuation control and the intake-amount increase control in step S230. After that, the ECM 30 measures again the amplitude S of the output fluctuation in the air-fuel-ratio sensor 18 in step S240. When the ECM 30 completes remeasurement of the amplitude S, the ECM 30 ends, in step S250, the control started in step S230. Subsequently, in step S260, the ECM 30 determines whether or not the remeasured amplitude S is equal to or more than a second stuck-closing determination value X2. The second stuck-closing determination value X2 may be set to the same value as the first stuck-closing determination value X1 or may be set to a different value.

In a case where the remeasured amplitude S is equal to or more than the second stuck-closing determination value X2 (S260: YES), the ECM 30 diagnoses, in step S220, that the WGV 25 is stuck closed, and the ECM 30 ends the process of FIG. 7. In the meantime, in a case where the remeasured amplitude S is less than the second stuck-closing determination value X2 (S260: NO), the ECM 30 diagnoses, in step S270, that the WGV 25 is not stuck closed, and the ECM 30 ends the process of FIG. 7.

Note that, in a case where the ECM 30 starts the air-fuel ratio fluctuation control in step S230 in FIG. 7, the processes of step S200 and step S210 correspond to a first diagnosis process, and the processes of step S240 and step S250 correspond to a second diagnosis process. Further, in a case where the ECM 30 starts the intake-amount increase control in step S230 in FIG. 7, the processes of step S200 and step S210 correspond to a third diagnosis process, and the processes of step S240 and step S250 correspond to a fourth diagnosis process.

Operations and Effects of Embodiment

By executing the air-fuel ratio fluctuation control or the intake-amount increase control during the execution of the diagnosis process as described above, it is possible to improve the accuracy in diagnosis on whether or not the WGV 25 is stuck closed. However, when the air-fuel ratio is forcibly fluctuated just after the start of the engine 10, combustion might become poor. Further, when the intake air is increased in amount in a state where the catalyst is not activated right after the start of the engine 10, the exhaust performance of the engine 10 might decrease.

In the meantime, in the present embodiment, at the time of the diagnosis process, the ECM 30 first diagnoses whether or not the WGV 25 is stuck closed, based on the amplitude S of the output fluctuation in the air-fuel-ratio sensor 18 in a state where the air-fuel ratio fluctuation control or the intake-amount increase control is not executed. After that, the ECM 30 executes the air-fuel ratio fluctuation control or the intake-amount increase control and then performs the diagnosis again. Even in a case where the valve stuck closing is not detected in the first diagnosis, the valve stuck closing may be detected in the re-diagnosis. Further, at the time of the re-diagnosis, a given time passes from the start of the engine 10. Accordingly, poor combustion due to forcible fluctuation in the air-fuel ratio or poor exhaust performance due to an increase in the amount of the intake air is hard to occur. On that account, the accuracy in the diagnosis is improved without worsening the combustion or the exhaust performance.

Other Embodiments

In the case of the engine 10 in FIG. 1, as illustrated in FIGS. 2, 3, the air-fuel-ratio sensor 18 is provided in a part where the exhaust gas passing through the bypass passage 24 is hard to hit the air-fuel-ratio sensor 18, but the exhaust gas passing through the turbine 22 easily hits the air-fuel-ratio sensor 18. Conversely, the air-fuel-ratio sensor 18 may be provided in a part where the exhaust gas passing through the passed turbine 22 is hard to hit the air-fuel-ratio sensor 18, but the exhaust gas passing through the bypass passage 24 easily hits the air-fuel-ratio sensor 18. The amplitude S of the output fluctuation in the air-fuel-ratio sensor 18 during execution of the catalyst early activation control in such a case is smaller in a case where the WGV 25 is stuck closed than in a case where the WGV 25 is not stuck closed. Accordingly, even in such a case, it is possible to diagnose whether or not the WGV 25 is stuck closed, based on the amplitude S of the output fluctuation in the air-fuel-ratio sensor 18 during the execution of the catalyst early activation control. Note that, in this case, in step S140 in FIG. 2, the ECM 30 determines whether or not the amplitude S is equal to or less than the stuck-closing determination value X. In a case where the amplitude S is equal to or less than the stuck-closing determination value X, the ECM 30 diagnoses that the WGV 25 is stuck closed, and in a case where the amplitude S exceeds the stuck-closing determination value X, the ECM 30 diagnoses that the WGV 25 is not stuck closed. Further, in this case, the determination in step S210 in FIG. 7 is to determine whether or not the amplitude S is equal to or less than the first stuck-closing determination value X1. Further, the determination in step S260 in FIG. 7 is to determine whether or not the amplitude S is equal to or less than the second stuck-closing determination value X2.

Further, the above embodiments can also be carried out by adding changes as stated below. The present embodiments and the following modifications can be carried out in combination as long as they do not cause any technical inconsistencies.

In a state where the engine 10 is driven with high output, and the flow rate of the exhaust air is high, the catalyzer 19 can be activated in some cases within an allowable time after the cold start even without executing the catalytic activation control. In view of this, in a case where the flow rate of the exhaust gas exceeds a given rate after the completion of the diagnosis process, the catalyst early activation control may be stopped or canceled at that point. Further, in a case where the flow rate of the exhaust gas decreases after the catalyst early activation control is stopped, the catalyst early activation control may be started again.

In the above embodiment, the opening degree of the WGV 25 is the fully-opened opening degree in the catalyst early activation control. In cases such as a case where there is an opening degree suitable to form an activated part early other than the fully-opened opening degree, the opening degree of the WGV 25 may be set to the intermediate opening degree during the catalyst early activation control.

In the third embodiment, an increased amount in the brake torque of the engine 10 due to the intake-amount increase control is absorbed by adjustment of the MG torque, but the increase amount in the brake torque of the engine 10 may be absorbed by other methods such as retardation of the ignition timing of the engine 10. Further, the torque absorption control may be executed such that the increased amount in the brake torque of the engine 10 due to the intake-amount increase control is only partially absorbed. Even in such a case, it is possible to restrain an increase in the driving force or the occurrence of blow-up of the engine revolution speed along with the execution of the intake-amount increase control. Further, if no problem is caused when the increased amount in the brake torque of the engine 10 due to the intake-amount increase control is just reflected on the driving force to drive the vehicle, the intake-amount increase control may be executed without executing a control to deal with the increase in the brake torque.

The air-fuel ratio fluctuation control in the second embodiment and the intake-amount increase control in the third embodiment may be both executed during the diagnosis process.

Details of the determination condition to determine whether or not the catalyzer 19 is activated, the determination condition to determine whether or not the activation is completed, and the diagnosis execution condition may be changed appropriately.

The invention claimed is:

1. An engine control device for controlling an engine including
   a combustion chamber in which combustion of fuel-air mixture is performed,
   an exhaust passage through which exhaust gas discharged from the combustion chamber flows,
   a turbocharger including a turbine provided in the exhaust passage,
   a bypass passage branching off from the exhaust passage at a part of the exhaust passage on an upstream side from the turbine and merging the exhaust passage at a part of the exhaust passage on a downstream side from the turbine,
   a wastegate valve configured to open and close the bypass passage,
   an air-fuel-ratio sensor provided in a part of the exhaust passage on the downstream side from the turbine, and
   a catalyzer configured to clean the exhaust gas, the catalyzer being provided in a part of the exhaust passage, the part being on the downstream side from the air-fuel-ratio sensor and on the downstream side from a merging position where the bypass passage merges with the exhaust passage, wherein the engine device executes the followings:
   a catalyst early activation control at cold start of the engine such that the catalyzer is promoted to be activated by opening the wastegate valve; and
   a diagnosis process of diagnosing whether or not the wastegate valve is stuck closed, based on an amplitude of output fluctuation in the air-fuel-ratio sensor during execution of the catalyst early activation control.

2. The engine control device according to claim 1, wherein an air-fuel ratio fluctuation control is executed during execution of the diagnosis process such that an air-fuel ratio of the fuel-air mixture to be burned in the combustion chamber is fluctuated.

3. The engine control device according to claim 2, wherein:
   the diagnosis process includes
      a first diagnosis process of diagnosing whether or not the wastegate valve is stuck closed in a state where the air-fuel ratio fluctuation control is not executed, and
      a second diagnosis process of diagnosing whether or not the wastegate valve is stuck closed in a state where the air-fuel ratio fluctuation control is executed; and
   the second diagnosis process is performed after the first diagnosis process.

4. The engine control device according to claim 1, wherein an intake-amount increase control is executed during execution of the diagnosis process such that an intake amount of the engine is increased.

5. The engine control device according to claim 4, wherein:
   the diagnosis process includes
      a third diagnosis process of diagnosing whether or not the wastegate valve is stuck closed in a state where the intake-amount increase control is not executed, and
      a fourth diagnosis process of diagnosing whether or not the wastegate valve is stuck closed in a state where the intake-amount increase control is executed; and
   the fourth diagnosis process is performed after the third diagnosis process.

6. The engine control device according to claim 4, wherein:
   the engine control device is provided in a hybrid electric vehicle including a generator motor drivingly connected to the engine;
   the engine control device controls a driving force to drive the hybrid electric vehicle through torque adjustment of both of the engine and the generator motor; and
   the engine control device executes a torque absorption control during execution of the intake-amount increase control such that an increased amount in torque of the engine due to the intake-amount increase control is at least partially absorbed by the torque adjustment of the generator motor.

\* \* \* \* \*